(12) United States Patent
Sturmer et al.

(10) Patent No.: US 6,571,920 B1
(45) Date of Patent: Jun. 3, 2003

(54) WHEEL HUB FOR BICYCLES

(75) Inventors: Joachim Sturmer, Schweinfurt (DE);
Peter Feiler, Bergrheinfeld (DE);
Markus Arbeiter, Cologne (DE); Peter Kroger, Schweinfurt (DE); Jean Bernard Plee, Cambron (FR)

(73) Assignee: SRAM Deutschland GmbH (DE)

( * ) Notice: Subject to any disclaimer, the term of this patent is extended or adjusted under 35 U.S.C. 154(b) by 0 days.

(21) Appl. No.: 09/700,791

(22) PCT Filed: Mar. 28, 2000

(86) PCT No.: PCT/EP00/02704

§ 371 (c)(1),
(2), (4) Date: Jan. 28, 2002

(87) PCT Pub. No.: WO00/61388

PCT Pub. Date: Oct. 19, 2000

(30) Foreign Application Priority Data

Apr. 8, 1999 (DE) ............................. 199 15 714

(51) Int. Cl.⁷ .................... B60B 27/02; B62L 1/00
(52) U.S. Cl. ........................................... 188/26
(58) Field of Search ................ 192/217.3, 64, 192/217, 46; 188/24.11, 26, 58, 24.17

(56) References Cited

U.S. PATENT DOCUMENTS 5,626,401 A    5/1997  Terry, Sr. et al.
6,065,580 A  * 5/2000  Kirk ........................ 192/217.3
6,336,531 B1 * 1/2002  Chou ........................... 188/26
6,371,252 B1 * 4/2002  Kanehisa ....................... 188/26
6,386,328 B1 * 5/2002  Chen ........................ 188/24.11

FOREIGN PATENT DOCUMENTS

| DE | 19532057 | 3/1997 |
| EP | 0955233  | 10/1998 |
| FR | 2684063  | 5/1993 |
| FR | 2752773  | 3/1998 |
| WO | 0011366  | 3/2000 |

* cited by examiner

Primary Examiner—Christopher P. Schwartz
Assistant Examiner—Melanie Torres
(74) Attorney, Agent, or Firm—Milan Milosevic; Lisa Wunderlich

(57) ABSTRACT

The invention relates to a wheel hub (1) for a running wheel of bicycle comprising a wheel hub axis (4), a wheel hub sleeve (2) having spoke flanges (3), and at least one bearing (5) located between the wheel hub axle (4) and the wheel hub sleeve (2), whereby arrangements are made for fixing the rotating part of a brake system, especially of a brake disk. Said arrangements consist of an adapter provided with fixing boreholes for fixing the brake disk and provided with an inner profile (8) which, on the wheel hub sleeve (2), can be connected in a rotationally fixed manner to a profile which is arranged on the wheel hub sleeve in a rotative manner and which is adapted to the inner profile. The invention is advantageous in that a universal wheel hub sleeve is produced which can be equipped either with or without a brake disk on which, however, the rotating part of another type of brake device can be applied.

9 Claims, 2 Drawing Sheets

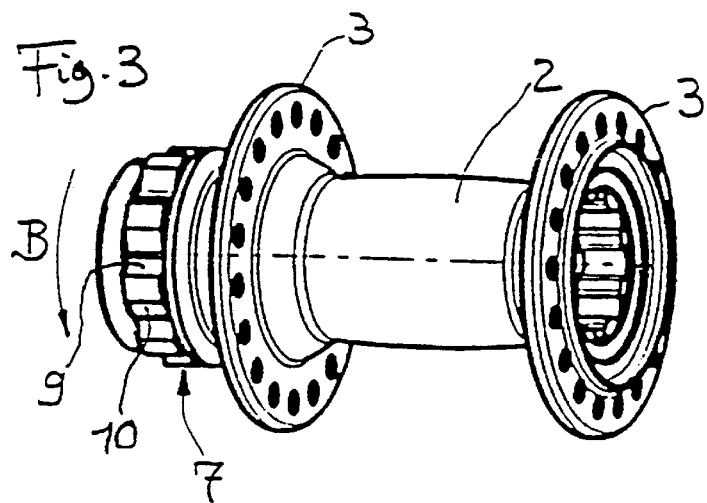
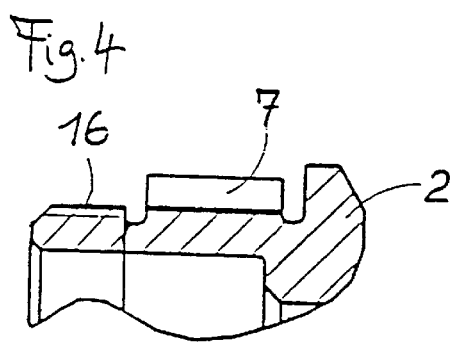
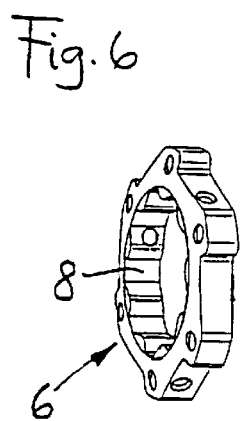
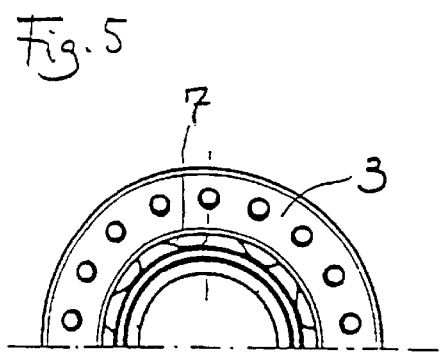
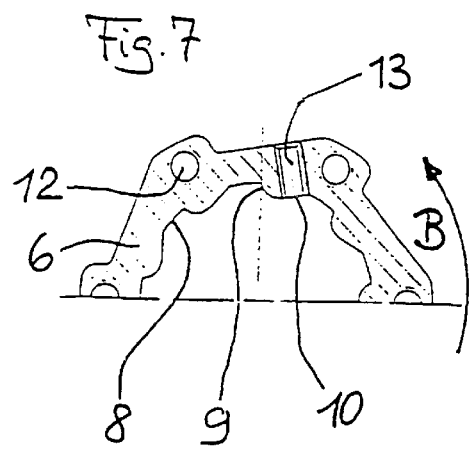

WHEEL HUB FOR BICYCLES

DESCRIPTION

The invention is concerned with a hub for a wheel of a bicycle for fixing a brake disk, in accordance with the preamble of claim 1.

DE 195 32 057 A1 has disclosed a knock-out spindle mount for bicycles having, in order to hold a knock-out spindle supporting a wheel, two bearing shells between which the knock-out spindle can be clamped. The hub has a hub sleeve having bearings on said knock-out spindle and also an adapter ring which can be connected to said hub sleeve and to which, according to FIG. 1, a brake disk can be connected by means of screws. The adapter ring has profiles which can be connected to profiles in the hub sleeve by plugging together, the hole of the ring keeping it centered on the knock-out spindle. Provided that the profiles also have a rubber layer, the brake disk is uncoupled during cycling from the hub sleeve in terms of vibration, thereby giving rise to advantages as regards noise production. However, play in the circumferential direction cannot be avoided and this may have a negative effect for the bicycle, since, particularly when cycling slowly, the feedback to the cyclist in terms of sensation suggests a disproportionately gentle initial deceleration for actuating the brake.

In contrast, the proposal according to the invention envisages connecting the brake disk to the hub in the circumferential direction without any play, it primarily being concerned with providing a universal hub sleeve which is fitted either with or without a brake disk and on the other hand may also be provided with different types of brake disks or brake drums.

The object of the invention is therefore to provide a hub sleeve for a hub for a bicycle, which hub sleeve can be fitted with a brake disk, it being possible for the brake disk to be mounted in the circumferential direction without any play. Furthermore, the hub sleeve is intended also to be fitted without a brake disk or else with other types of brakes.

The object is achieved in the form of an adapter which has an internal profile and can be plugged onto the hub sleeve which, for its part, has a profile fitting the internal profile. The adapter is fixed in one braking direction of rotation by means of at least one screw, with the result that, in the event of braking, the hub sleeve is always carried along via the adapter without any play. The brake disk can be connected via fixing holes to the adapter, said adapter being fixed axially by a fixing part. The fixing part has a collar which points radially inward and covers a bearing of the hub and therefore protects it from the ingress of dirt.

If a disk brake is to be omitted, the hub sleeve can be used in unchanged form, it being possible for a simple covering to be used in place of the adapter and the fixing part, said covering satisfying the requirements for sealing the bearing.

An exemplary embodiment of a hub with the possibility of attaching a brake disk is explained with reference to a number of drawings, in which:

FIG. 3 shows the hub sleeve with a profile for fixing the adapter;

FIG. 4 shows the hub sleeve with the profile and with a fixing thread for the fixing part;

FIG. 5 shows a partial view of the hub sleeve with the profile;

FIG. 6 shows a perspective illustration of the adapter with an internal profile consisting of two flanks;

FIG. 7 shows the adapter with a screw hole for producing tangential freedom of play with respect to the hub sleeve.

If 1 denotes a hub for a bicycle for fixing a brake disk, said hub has a hub sleeve 2 which is connected via bearings 5 to a fixed hub axle 4. The hub sleeve has spoke flanges 3 which are usually connected to a rim via spokes and form a wheel for the bicycle.

Figure 1:
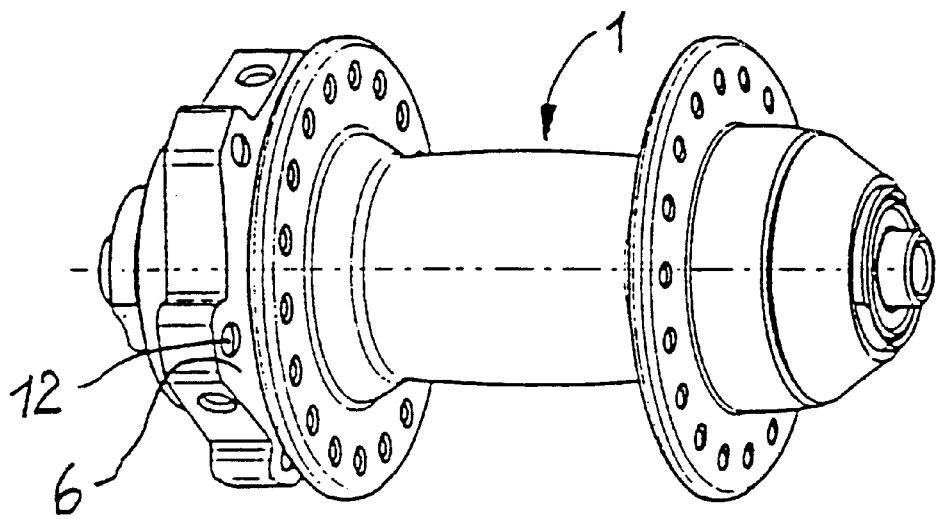
FIG. 1 shows a hub with an adapter for fixing a brake disk.
Figure 2:
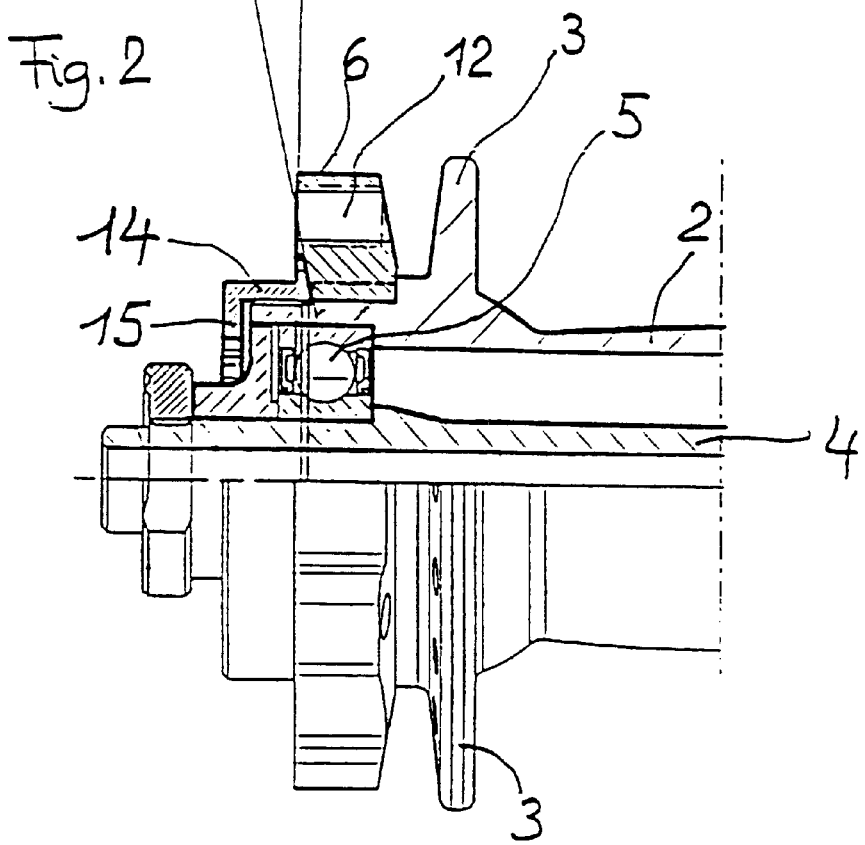
FIG. 2 shows, in partial section, the connection of the adapter to a hub sleeve of the hub by means of a fixing part.

According to FIGS. 1, 2, 3 and 4, the hub sleeve 2 has a profile 7 which has a first flank 9 and a second flank 10. The profile is arranged in toothed form on the periphery and can be produced without cutting, in which case, if an injection-molding process is used, one mold half has to be drawn in the axial direction. An adapter 6 can be connected to said profile 7, said adapter 6 having an internal profile 8 and, like the profile 7, having a first flank 9 and a second flank 10. Since the profile 7 is joined to the internal profile 8 of the adapter 6, the adapter 6 can be fitted in a more fixed manner in both directions of rotation by the hub sleeve 2 by being pushed on, in which case a small tangential play may arise which may allow unpleasant shocks to occur during cycling when torque is introduced via the adapter 6 to the hub sleeve 2. For this reason, there is arranged in FIGS. 6 and 7 at least one screw hole 13 which runs radially through the adapter and is directed against the second flank 10. As emerges from FIG. 7, the first flank 9 is arranged in one braking direction of rotation B and is steeper than the second flank 10, which does not have to transmit any forces in the braking direction of rotation B. When a screw is screwed into the screw hole 13, pressure is exerted by the adapter 6 on the second flank 10, as a result of which the adapter 6 is rotated in the braking direction of rotation B until the play is used up, and the first flank 9 of the internal profile 8 is pressed against the first flank 9 of the profile 7 on the hub sleeve 2. In this case, a brake disk fixed via fixing holes 12 to the adapter 6 can transmit the braking torque directly to the hub sleeve 2 without having to pass through any damaging play.

A fixing part 14 is screwed onto a fixing thread 16 and against the adapter 6, as a result of which the latter is secured axially. Arranged at the location of contact between the fixing part 14 and the adapter 6 is a dish-like contact surface having an angle 17, as a result of which the adapter 6 is additionally centered on the hub sleeve 2 when the fixing part 14 is being screwed on. The fixing part 14 forms, together with the adapter 6, a right angle which enables the brake disk to be centered when being fixed on the adapter 6. The fixing part 14 has a collar 15 which points radially inward and extends around the hub sleeve 2 and over the bearing 5, thereby forming an additional sealing location against the ingress of dirt.

What is claimed is:

1. A hub (1) for a wheel of a bicycle, comprising a hub axle (4), a hub sleeve (2) having spoke flanges (3), and at least one bearing (5) between the hub axle (4) and the hub sleeve (2), arrangements being made to fix the rotating part of a brake system, in particular of a brake disk, characterized in that the arrangements comprise an adapter (6) having fixing holes (12) for fixing the brake disk, and having an internal profile (8) which can be connected in a rotationally fixed manner to the hub sleeve (2) on a profile (7) which is arranged around its periphery and is matched to the internal profile (8).

2. The hub as claimed in claim 1, characterized in that
the profile (7) and the internal profile (8) have a toothed form with a first flank (9) and with a second flank (10).

3. The hub as claimed in claim 1 characterized in that in a braking direction of rotation (B) the first flank (9) can transmit a braking torque from the brake disk to the hub sleeve (2).

4. The hub as claimed in claim 1 characterized in that
the adapter (6) has a screw hole (13) for a screw, the screw being directed against the second flank (10) of the profile and being able to produce at this point a tangential prestress between the hub sleeve (2) and the adapter (6), said prestress bracing the first flank (9) of the profile (7) and of the internal profile (8) against each other.

5. The hub as claimed in claim 4, characterized in that
the screw hole (13) is directed approximately perpendicularly onto the second flank (10).

6. The hub as claimed in claim 1, characterized in that
the fixing part (14) is a threaded ring which is screwed onto a fixing thread (16) on the hub sleeve (2) in the direction of the adapter (6).

7. The hub as claimed in claim 1, characterized in that
the fixing part (14) has, on its end surface which runs annularly and comes into contact with the adapter (6), a flat angle (17) with a dish-shaped profile.

8. The hub as claimed in claim 1, characterized in that
the fixing part (14) has a collar (15) for forming a sealing location for the bearing (5).

9. The hub as claimed in claim 6 characterized in that,
in the event of an adapter (6) not being fixed in place, the hub sleeve (2) may be provided with a covering in place of the profile (7) and/or in place of the fixing thread (16).

* * * * *

(12) INTER PARTES REEXAMINATION CERTIFICATE (0007th)
United States Patent
Sturmer et al.

(10) Number: US 6,571,920 C1
(45) Certificate Issued: Sep. 26, 2006

(54) WHEEL HUB FOR BICYCLES

(75) Inventors: Joachim Sturmer, Schweinfurt (DE);
 Peter Feiler, Bergrheinfeld (DE);
 Markus Arbeiter, Cologne (DE); Peter Kroger, Schweinfurt (DE); Jean Bernard Plee, Cambron (FR)

(73) Assignee: SRAM Deutschland GmbH (DE)

Reexamination Request:
 No. 95/000,026, Sep. 3, 2003

Reexamination Certificate for:
 Patent No.: 6,571,920
 Issued: Jun. 3, 2003
 Appl. No.: 09/700,791
 Filed: Jan. 28, 2002

(22) PCT Filed: Mar. 28, 2000
(86) PCT No.: PCT/EP00/02704
 § 371 (c)(1),
 (2), (4) Date: Jan. 28, 2002
(87) PCT Pub. No.: WO00/61388
 PCT Pub. Date: Oct. 19, 2000

(30) Foreign Application Priority Data
 Apr. 8, 1999 (DE) .......................... 199 15 714

(51) Int. Cl.
 *B62L 1/00* (2006.01)

(52) U.S. Cl. ........................................ 188/26
(58) Field of Classification Search ............ 301/6.1, 301/6.9, 59, 110.5; 403/359.5; 188/24.22, 188/26
 See application file for complete search history.

(56) References Cited

U.S. PATENT DOCUMENTS

| | | | | |
|---|---|---|---|---|
| 1,541,007 | A | * 6/1925 | Thiemer | 403/359.5 |
| 1,598,019 | A | * 8/1926 | Shirley | 301/6.1 |
| 2,102,406 | A | * 12/1937 | Cohen | 301/6.1 |
| 3,269,494 | A | * 8/1966 | Tantlinger et al. | 188/206 R |
| 3,927,736 | A | 12/1975 | Bergles | |
| 5,193,833 | A | 3/1993 | Reisinger | |
| 6,065,580 | A | * 5/2000 | Kirk | 192/217.3 |
| 6,164,421 | A | 12/2000 | Nakamura et al. | |
| 6,206,144 | B1 | 3/2001 | Di Bella | |

(Continued)

FOREIGN PATENT DOCUMENTS

| | | |
|---|---|---|
| EP | 0 194 551 | 9/1986 |
| FR | 2 752 773 | 3/1998 |

OTHER PUBLICATIONS

Shimano Dealers' 1990 Product Manual, Aug., 1989, Japan, p. 64.
Bicycle Club, Feb., 1994, Japan.
Bicycle Club, Jul., 1994, Japan.
1998 Formula; ten pages (1–8, and 23–25), available on or prior to Sep. 9, 1997 in the United States.
1997–98 Taiwan Bicycles & Parts Guide pp. 1, 348, and 349.
Engineering Drawing of Shimano Hub SG–7R40.
Engineering Drawing of Shimano Hub SG–4R31.

*Primary Examiner*—Robert A. Siconolfi

(57) ABSTRACT

The invention relates to a wheel hub (1) for a running wheel of bicycle comprising a wheel hub axis (4), a wheel hub sleeve (2) having spoke flanges (3), and at least one bearing (5) located between the wheel hub axle (4) and the wheel hub sleeve (2), whereby arrangements are made for fixing the rotating part of a brake system, especially of a brake disk. Said arrangements consist of an adapter provided with fixing boreholes for fixing the brake disk and provided with an inner profile (8) which, on the wheel hub sleeve (2), can be connected in a rotationally fixed manner to a profile which is arranged on the wheel hub sleeve in a rotative manner and which is adapted to the inner profile. The invention is advantageous in that a universal wheel hub sleeve is produced which can be equipped either with or without a brake disk on which, however, the rotating part of another type of brake device can be applied.

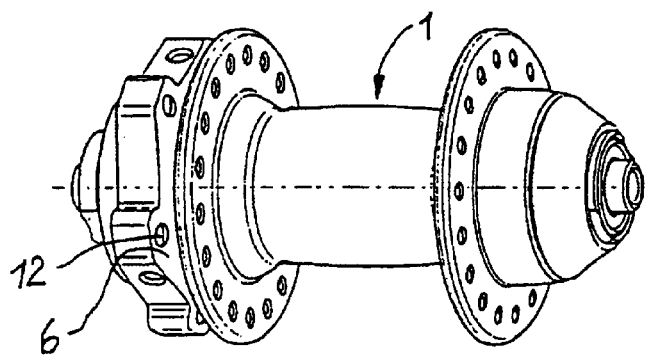

U.S. PATENT DOCUMENTS

| | | | |
|---|---|---|---|
| 6,241,616 B1 * | 6/2001 | Lightcap | 403/359.5 |
| 6,336,531 B1 * | 1/2002 | Chou | 188/26 |
| 6,371,252 B1 * | 4/2002 | Kanehisa | 188/26 |
| 6,386,328 B1 * | 5/2002 | Chen | 188/26 |
| 6,540,306 B1 * | 4/2003 | Kanehisa | 301/59 |
| 6,578,676 B1 * | 6/2003 | Lin | 188/26 |

* cited by examiner

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–9 are cancelled.

* * * * *